US006481629B1

(12) United States Patent
Hirabayashi et al.

(10) Patent No.: US 6,481,629 B1
(45) Date of Patent: Nov. 19, 2002

(54) PC CARD WITH VARIABLE WIDTH DATA BUS COMMUNICATION CAPABILITIES

(75) Inventors: Akira Hirabayashi, Kanazawa (JP); Hiroyuki Hidenaga, Yamato (JP)

(73) Assignees: I-O Data Device, Inc., Kanazawa (JP); Workbit Corporation, Yamato (JP)

( * ) Notice: Subject to any disclaimer, the term of this patent is extended or adjusted under 35 U.S.C. 154(b) by 0 days.

(21) Appl. No.: 09/508,180

(22) PCT Filed: Aug. 26, 1998

(86) PCT No.: PCT/JP98/03819

§ 371 (c)(1),
(2), (4) Date: Mar. 7, 2000

(87) PCT Pub. No.: WO99/21127

PCT Pub. Date: Apr. 29, 1999

(30) Foreign Application Priority Data

Oct. 17, 1997 (JP) ............................... 9-285813
Feb. 9, 1998 (JP) ............................ 10-027038

(51) Int. Cl.[7] .............................................. G06K 19/00
(52) U.S. Cl. ................... 235/487; 235/486; 235/492; 365/238.5; 365/230.02; 365/189.02; 364/240.03
(58) Field of Search ................. 235/487, 486, 235/492; 364/240.3; 365/189.02, 238.5, 230.02

(56) References Cited

U.S. PATENT DOCUMENTS

| | | | | |
|---|---|---|---|---|
| 4,309,754 A | * | 1/1982 | Dinwiddie, Jr. | 710/307 |
| 4,447,878 A | * | 5/1984 | Kinnie et al. | 370/362 |
| 4,514,808 A | * | 4/1985 | Murayama et al. | 710/307 |
| 4,683,534 A | * | 7/1987 | Tietjen et al. | 710/307 |
| 5,055,661 A | * | 10/1991 | Gochi | 235/492 |
| 5,119,498 A | * | 6/1992 | McNeil et al. | 395/800 |
| 5,310,998 A | * | 5/1994 | Okuno | 235/380 |
| 5,333,294 A | * | 7/1994 | Schnell | 395/425 |
| 5,938,750 A | * | 8/1999 | Shaberman | 710/102 |
| 5,960,085 A | * | 9/1999 | de la Huerga | 380/25 |
| 6,026,486 A | * | 2/2000 | Kodama et al. | 712/229 |
| 6,062,480 A | * | 5/2000 | Evoy | 235/440 |
| 6,085,269 A | * | 7/2000 | Chan et al. | 710/100 |
| 6,146,150 A | * | 11/2000 | Roberts | 439/55 |
| 6,290,513 B1 | * | 9/2001 | Kakinoki et al. | 439/108 |

FOREIGN PATENT DOCUMENTS

| | | | |
|---|---|---|---|
| JP | 1277946 | | 11/1989 |
| JP | 290344 | | 3/1990 |
| JP | 4262483 | | 9/1992 |
| JP | 6266614 | | 9/1994 |
| JP | 8166906 | | 6/1996 |
| JP | 411259417 A | * | 9/1999 |

* cited by examiner

*Primary Examiner*—Karl D. Frech
*Assistant Examiner*—Daniel Walsh
(74) *Attorney, Agent, or Firm*—Pillsbury Winthrop LLP

(57) ABSTRACT

In a PC card to be connected to a personal computer, two kinds of operational modes which are different in data bus width from each other can be changed over selectively. Either the CardBus mode with a data bus width of 32 bits or the 16-bit mode is selectable by a selector switch provided in a side face. The PC card 1 is operated in the 16-bit mode for use with a 16-bit-compatible personal computer, and operated in the 32-bit mode for use with a 32-bit-compatible personal computer. Thus, one PC card is useable with various personal computers.

9 Claims, 11 Drawing Sheets

PC CARD WITH VARIABLE WIDTH DATA BUS COMMUNICATION CAPABILITIES

BACKGROUND OF THE INVENTION

The present invention relates to a card-like medium and a PC card for, upon insertion into a slot provided in the body of an information processing apparatus, performing data communications with the information processing apparatus via a bus.

Conventionally, there have been proposed PC cards serving for expanding the potential of information processing apparatuses such as personal computers. A PC card, when inserted into an exclusive slot provided in the body of an information processing apparatus, is connected to the information processing apparatus with buses (data bus, address bus, control bus) or the like. Some PC cards play a role as a recording medium, and others as an interface with externally connected equipment. Only by exchanging the PC cards to be inserted into the slot, the user is allowed to make use of the functions of the inserted PC card in the information processing apparatus, thus enabled to extend and change the functions of the information processing apparatus with simplicity and ease.

However, with the conventional 16-bit system, in which an information processing apparatus and a PC card are connected to each other with a 16-bit wide data bus, only a maximum of 16-bit data can be transferred in one cycle of data transfer. As a result, there has been a problem that a long time would be taken from start to completion of data transfer in the processing of high volume of transfer data. This being the case, the CardBus system, in which an information processing apparatus and a PC card are connected to each other with a 32-bit wide data bus, has been proposed as a PC card standard. An information processing apparatus compatible with this system (CardBus-compatible information processing apparatus) has a function of discriminating whether or not a PC card inserted into the slot is CardBus compatible, where if the PC card is CardBus compatible, the apparatus connects the PC card with a 32-bit wide data bus (connection in the CardBus system); if the PC card is 16-bit compatible other than CardBus compatible, the apparatus connects the PC card with a 16-bit wide data bus (connection in the 16-bit system), thus the information processing apparatus being enabled to use both CardBus-compatible PC cards and 16-bit-compatible PC cards.

However, CardBus-compatible PC cards have been so designed as to be usable only in CardBus-compatible information processing apparatuses, and not in CardBus-incompatible, 16-bit-compatible information processing apparatuses. Therefore, in order to enable the use of a PC card in both CardBus-compatible information processing apparatuses and 16-bit-compatible information processing apparatuses, it has been inevitable to use a 16-bit-compatible PC card. In this case, a 16-bit-compatible PC card would be used in a CardBus-compatible information processing apparatus, resulting in a problem that the functions of the CardBus-compatible information processing apparatus could not be fully exploited.

Even among CardBus-compatible information processing apparatuses, some operating systems (OS) have no software for CardBus-compatible socket services or the like, where while the information processing apparatus is running on such an OS, CardBus-compatible PC cards are unusable. Also, with a CardBus-compatible PC card used in a CardBus-compatible information processing apparatus, there are some cases where the information processing apparatus proper or its peripheral equipment become unstable in operation depending on the environment in which the PC card is used. Further, among CardBus-compatible information processing apparatuses having two or more slots for insertion of a PC card, there are some apparatuses in which two CardBus-compatible PC cards, when inserted into the apparatus, become unusable in terms of the specifications of the information processing apparatus (where a CardBus-compatible PC card and a 16-bit-compatible PC card, when inserted into the apparatus, are usable). From these and other reasons, there has been a demand for a PC card that can be operated in either the 16-bit mode or the CardBus mode optionally depending on the use environment. Also, whereas it is conceivable that a system for standards of longer data bus width emerge in the future to substitute for the CardBus system, problems similar to those described above may arise also in such a case. Therefore, under the existing circumstances, there is a general demand for the emergence of a PC card or a card-like medium that can be operated in a plurality of modes which are different from one another in data bus width.

Accordingly, it is an object of the present invention to provide a card-like medium and a PC card which can be changed over between two kinds of operational modes that are different from each other in the width of the data bus by which data communications with information processing apparatuses are performed, so that the card-like medium and the PC card can be operated properly in accordance with the use environment.

SUMMARY OF THE INVENTION

In order to achieve the above object, according to the present invention, there is provided a card-like medium which, when inserted into a slot provided in an information processing apparatus proper, is connected to the information processing apparatus proper, the card-like medium comprising:

a control section for controlling operation in a first operational mode in which data communications with the information processing apparatus proper are carried out with a data bus having a first bit width, and operation in a second operational mode in which data communications with the information processing apparatus proper are carried out with a data bus having a second bit width; and selection means for selectively changing over between the first operational mode and the second operational mode.

The card-like medium of this constitution is inserted into a slot provided in the body of the information processing apparatus, and connected to the information processing apparatus. The selection means serves for changing over the operational mode in which the card-like medium performs data communications with the information processing apparatus by means of the data bus having the first bit width or the data bus having the second bit width. Therefore, the card-like medium can be selectively changed over in operational mode depending on the functions of the information processing apparatus proper to which the card-like medium is connected. Thus, the card-like medium is enabled to make full use of the functions of the information processing apparatus proper.

When the selection means is a hard switch which is changed over artificially, the user is enabled to intentionally select an operational mode, so that the card-like medium can properly be operated in accordance with the use environment.

When the selection means changes over the operational mode depending on state of a specific signal inputted from the information processing apparatus proper, the card-like medium can make the selection means automatically select the first operational mode when the card-like medium is inserted into an information processing apparatus compatible with the first operational mode and select the second operational mode when the card-like medium is inserted into an information processing apparatus compatible with the second operational mode.

The card-like medium further comprises a hard switch for changing over a selection as to whether the operational mode is fixed to the first operational mode regardless of the state of the specific signal.

With this arrangement, for example, when the card-like medium is inserted into an information processing apparatus compatible with both the first operational mode and the second operational mode, the card-like medium can be operated with the operational mode fixed to the first operational mode.

With an arrangement that the hard switch is provided so as to be located inside the slot when the card-like medium is connected to the information processing apparatus, the hard switch located inside the slot is disabled from changing-over operation when the card-like medium and the information processing apparatus are connected to each other. Therefore, while data communications between the card-like medium and the information processing apparatus are going on, the card-like medium can be prevented from being changed over in operational mode by a user's misoperation of the hard switch. This also prevents occurrence of problems such as malfunction due to a changeover of the operational mode during the operation and damage of the card-like medium and the information processing apparatus.

With an arrangement that the card-like medium further comprises a constant-voltage power supply circuit which is fed with power supply from the information processing apparatus proper and supplies a generally constant-voltage operating power to individual sections of the card-like medium, the individual sections of the card-like medium can be free from any damage due to application of an overvoltage even when the voltage of the power supplied from the information processing apparatus proper differs depending on the information processing apparatus to which the card-like medium is connected.

Further, by applying the present invention to a PC card, where the first operational mode is a mode in which data communications based on the 16-bit system are carried out (16-bit mode) and the second operational mode is a mode in which data communications based on the CardBus system are carried out (CardBus mode), a PC card which can be operated in an optimal mode in accordance with the use environment can be obtained.

DETAILED DESCRIPTION OF THE PREFERRED EMBODIMENTS

Figure 1:
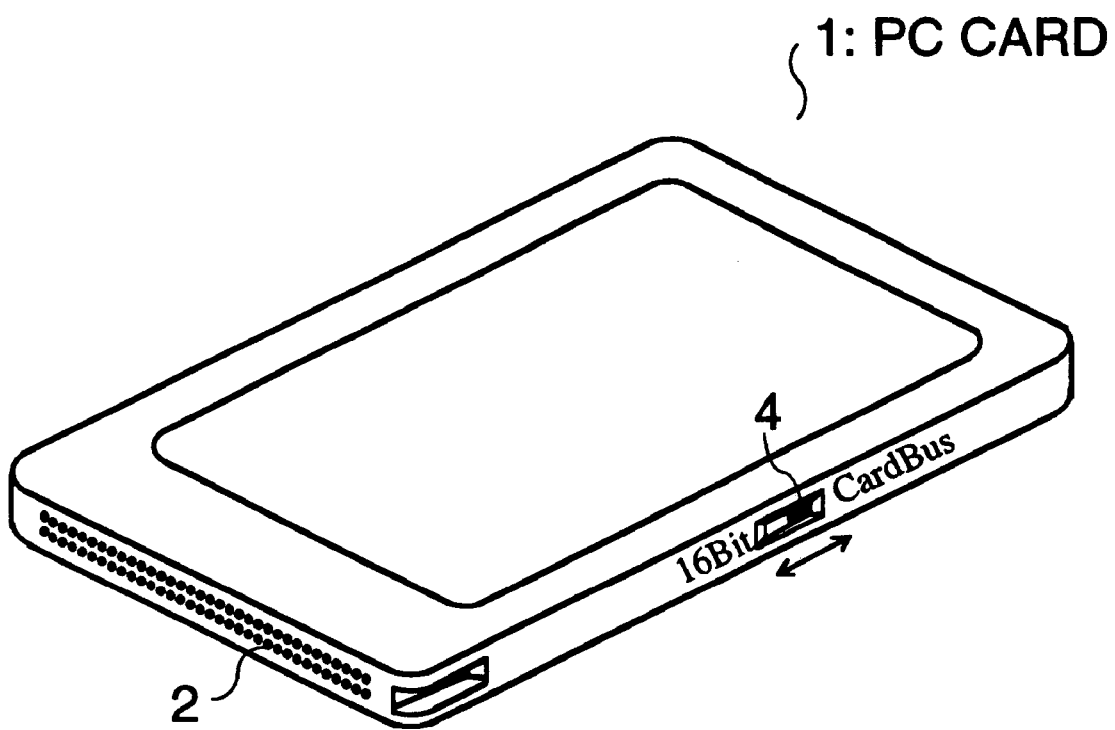
FIG. 1 is a view showing the appearance of a PC card which is an embodiment of the invention.
Figure 2A:
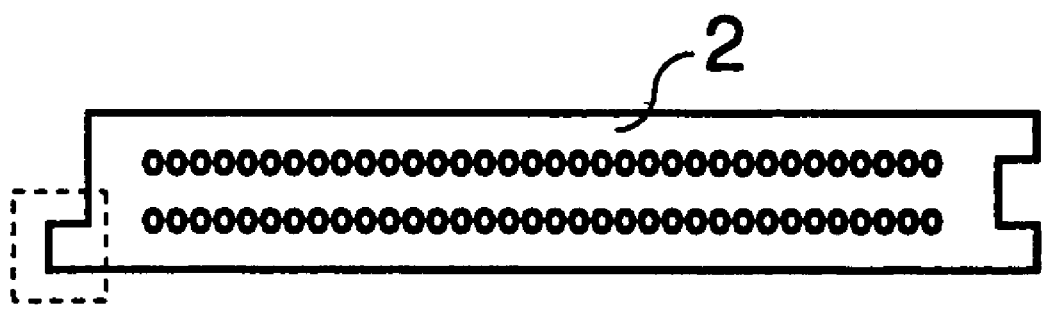
FIGS. 2A and 2B are a front view and a rear view, respectively, of the PC card which is an embodiment of the invention.
Figure 2B:
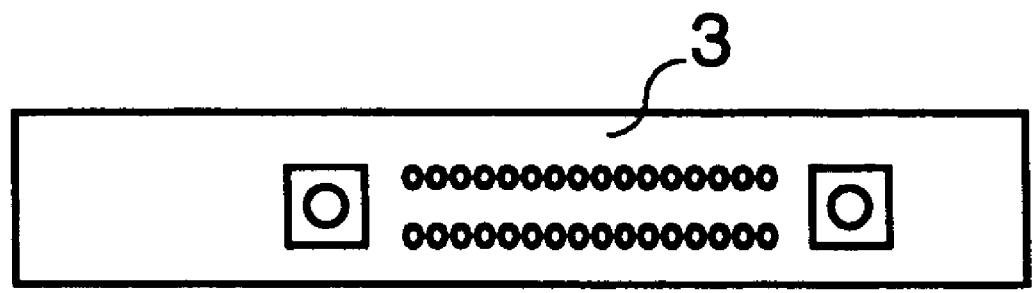

FIG. 1 is a view showing the appearance of a PC card which is an embodiment of the invention. FIG. 2A is a front view of the PC card, and FIG. 2B is a rear view of the PC card. A connector 2 to be connected to a connector provided in an information processing apparatus proper such as a personal computer is provided in the front face of the PC card 1, and a connector 3 for connection with external equipment is provided in the rear face. The PC card 1 is inserted into an exclusive slot provided in the information processing apparatus, and connected to a data bus, an address bus, a control bus and the like of the information processing apparatus. The connector 3, in the case of a PC card 1 serving for modem function as an example, is connected to the telephone line, and in the case of a PC card 1 serving for IDE interface function, is connected to an IDE device (e.g., a hard disk). The PC card 1 of this embodiment operates in two operational modes, i.e., the 16-bit mode, which is an operational mode for carrying out data communications based on the 16-bit system, and the CardBus mode, which is an operational mode for carrying out data communications based on the CardBus system, and a selector switch 4 for a user to specify either one of the two operational modes is provided in a side face of the PC card 1.

A 16-bit-compatible information processing apparatus, which does not assume the connection with any CardBus-compatible PC card, adopts an arrangement that a power of a 5 V voltage (operating voltage of 16-bit-compatible PC cards) is fed to the inserted PC card. Therefore, if a CardBus-compatible PC card which operates on a 3.3 V power supply can be connected to a 16-bit-compatible information processing apparatus, there is a possibility that a CardBus-compatible PC card, when erroneously connected to the information processing apparatus, may be damaged by the power supply of a 5 V voltage. Thus, in a conventional CardBus-compatible PC card, it has been the case that a left side end portion of the connector 2 surrounded by broken line in FIG. 2A is made thicker than that of a 16-bit-compatible PC card, so that this left side end portion makes an obstacle that inhibits the PC card from being fitted to the connector in the slot provided in the 16-bit-compatible information processing apparatus (that is, conventional CardBus-compatible PC cards have been so designed as to be unconnectable to 16-bit-compatible information processing apparatuses). On the other hand, the connector 2 of the PC card 1 in this embodiment is identical in shape to the conventional 16-bit-compatible PC cards, so that the PC card 1 is connectable to both 16-bit-compatible information processing apparatuses and CardBus-compatible information processing apparatuses. In addition, the PC card 1 of this embodiment is also prepared to prevent damage due to the power supply of a 5 V voltage, as described later.

Figure 3:
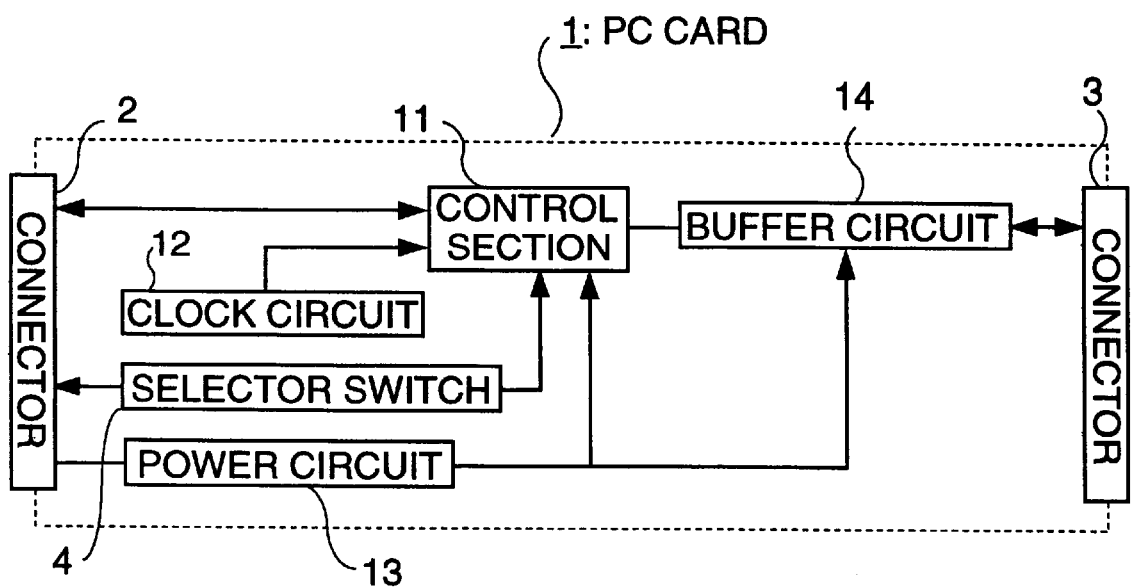
FIG. 3 is a block diagram showing the constitution of the PC card of this embodiment.
Figure 4A:
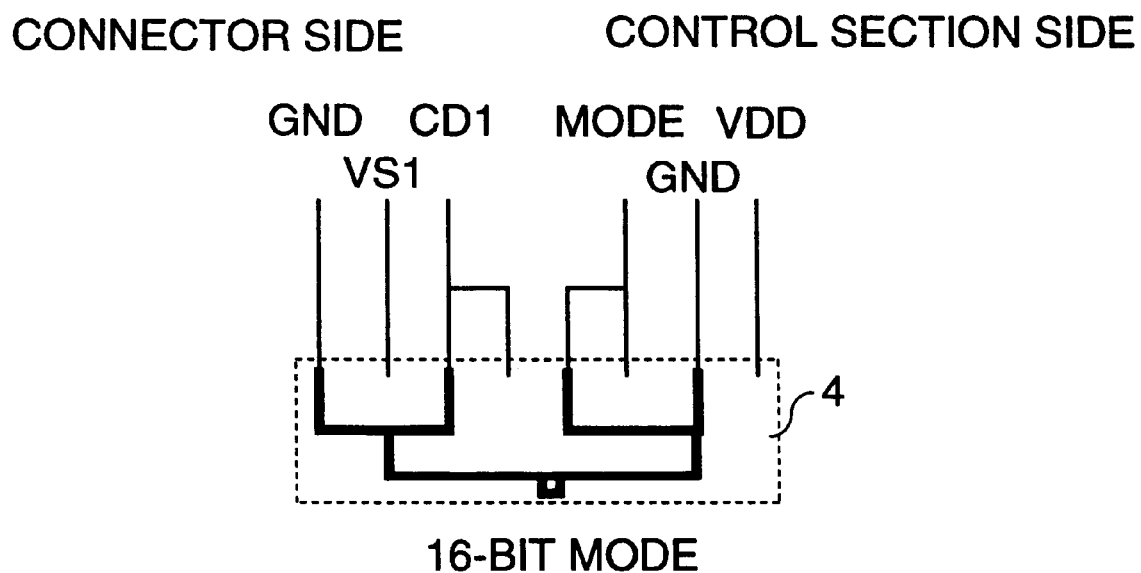
FIGS. 4A and 4B are views showing the constitution of the selector switch.
Figure 4B:
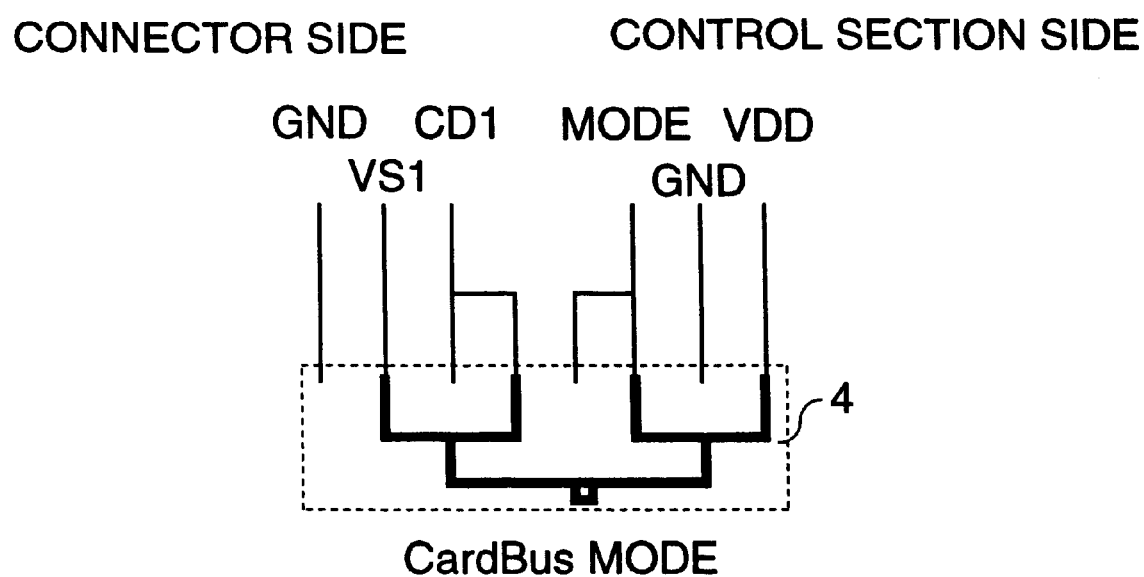

FIG. 3 is a block diagram showing the constitution of the PC card of this embodiment. The figure shows a control section 11 for controlling the operation of the PC card 1, a clock circuit 12 for giving a clock signal to the control section 11 or the like, a power circuit 13 for supplying operating power to the control section 11 or the like, and a buffer circuit 14 for temporarily storing therein data or the like to be transmitted to external equipment connected via the connector 3. The power circuit 13 is a constant-voltage power supply circuit, its output voltage being about 3.3 V. It is noted that this power circuit 13 does not have batteries inside but is supplied with power from an external information processing apparatus via the connector 2. The selector switch 4 is a double-pole, two-contact switch shown in FIGS. 4A and 4B. FIG. 4A shows a state in which the 16-bit mode is selected, and FIG. 4B shows a state in which the CardBus mode is selected. As shown in FIG. 4A, in the 16-bit mode, a signal CD1 connected to the information processing apparatus is grounded, and a MODE signal inputted to the control section 11 is Low. In the CardBus mode, on the other hand, CD1 connected to the information processing apparatus is connected to VS1, and the MODE signal inputted to the control section 11 is High with power supplied from the information processing apparatus. Depending on the signal level logic of the MODE signal, the PC card 1 recognizes the operational 25 mode.

Figure 5:
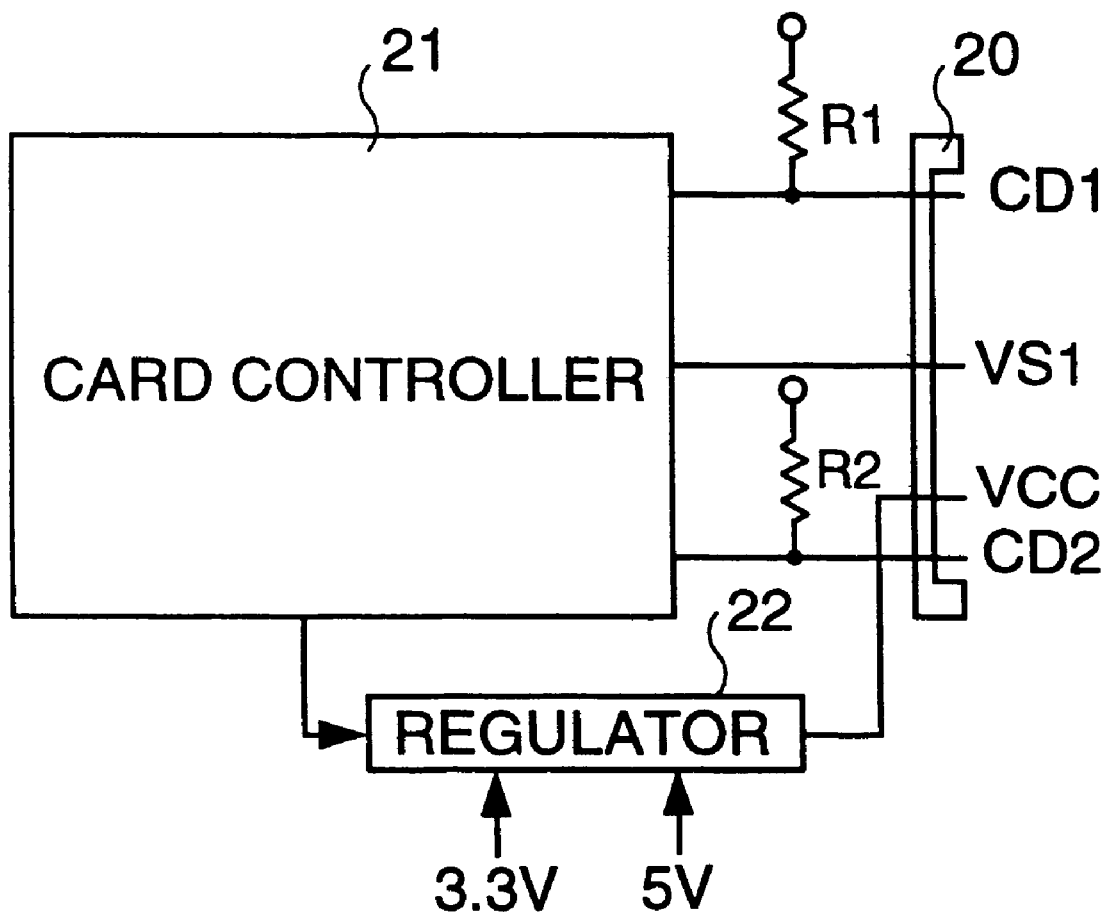
FIG. 5 is a view showing the constitution of a connecting portion of an information processing apparatus with the PC card.

FIG. 5 shows the constitution of a connecting portion of an information processing apparatus with the PC card 1. This information processing apparatus in FIG. 5 is a CardBus-compatible information processing apparatus. Numeral 20 denotes a connector to be connected to the connector 2 of the PC card 1. Denoted by numeral 21 is a card controller for controlling data communications or the like with the connected PC card 1, and 22 is a regulator for supplying an operating power VCC of 3.3 V or 5 V to the inserted PC card 1. FIG. 5 shows a signal CD2 for the information processing apparatus to detect that the PC card 1 has been inserted into the slot, and signals CD1 and VS1 for discriminating whether the PC card 1 inserted into the slot is 16-bit compatible or CardBus compatible, and an operating power VCC supplied to the PC card 1 inserted into the slot. Although other signals are also exchanged between the information processing apparatus and the PC card 1, those signals are omitted here. The signals CD1 and CD2 are pulled up within the information processing apparatus proper as shown in FIG. 5. As illustrated in FIG. 5 and as explained in further detail below, when the PC card 1 is inserted into the information processing apparatus, the line over which CD2 is transmitted may be coupled to GND by resistor R2'. Similarly, the line over which CD1 is transmitted may be coupled to GND or VS1 by resistor R1'.

Figure 6:
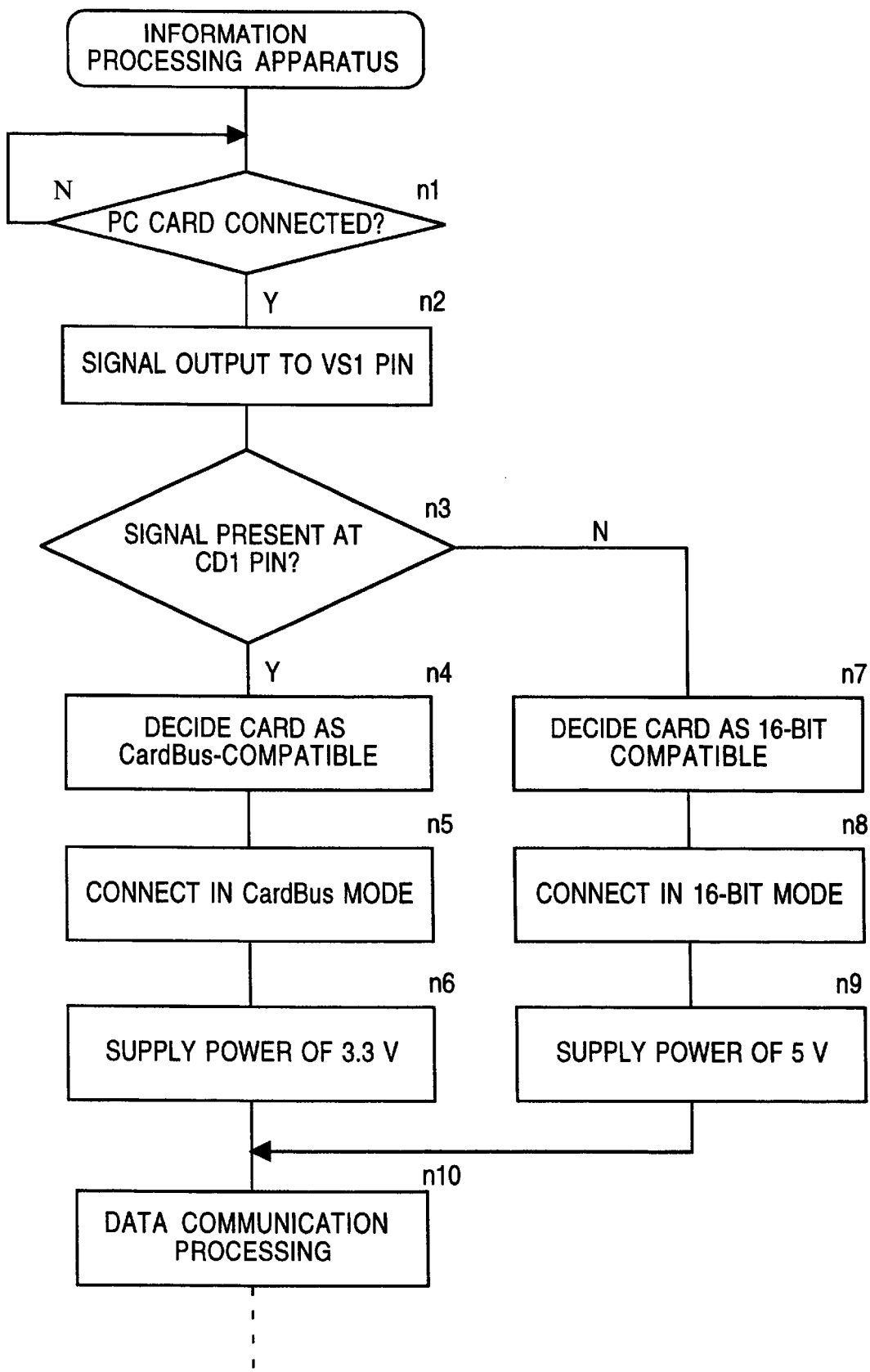
FIG. 6 is a flowchart showing the processing of the information processing apparatus.
Figure 7:
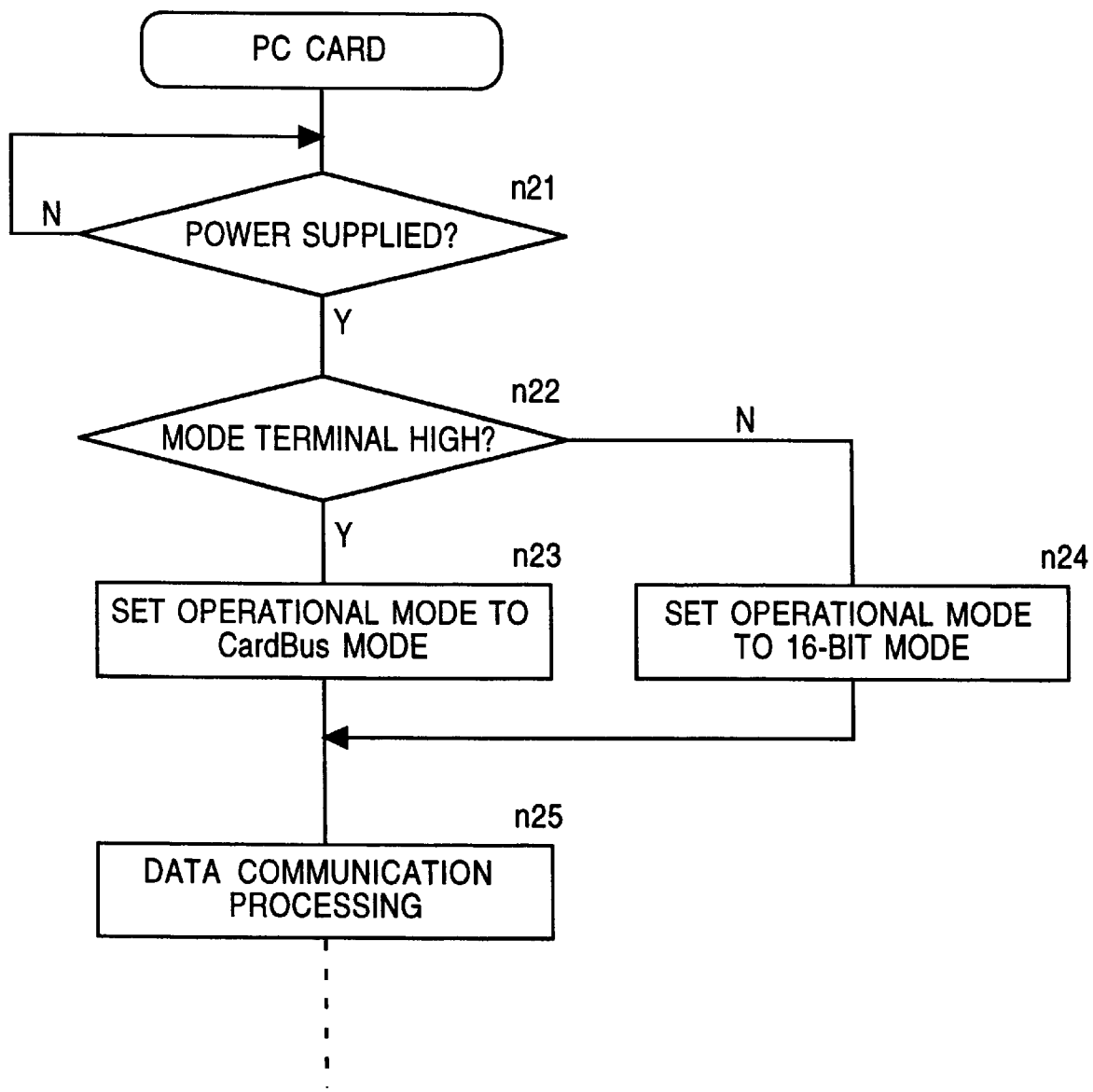
FIG. 7 is a flowchart showing the processing of the PC card.

Now, operation of the PC card 1 according to this embodiment is described. FIG. 6 is a flowchart showing the processing of the information processing apparatus, and FIG. 7 is a flowchart showing the processing of the PC card. When the user inserts the PC card 1 into the exclusive slot provided in the information processing apparatus so that the information processing apparatus and the PC card 1 are connected to each other, CD2 is grounded on the PC card 1 side, although not shown. The card controller 21 within the information processing apparatus is normally monitoring the state of CD2, and recognizes, when this signal CD2 changes from High to Low, that the PC card 1 is inserted into the slot and connected. Upon recognizing that the PC card 1 has been connected (n1), the card controller 21 inputs a pulse signal (with voltage 3.3 V) of an appropriate frequency to VS1 (n2), thereby monitoring the signal CD1 (n3). In addition, as is well known, the PC card 1 is connected to the information processing apparatus in such a way that the PC card 1 is generally wholly inserted into the slot provided in the information processing apparatus proper. Therefore, in this connection state, the selector switch 4 provided in a side face of the PC card 1 is located inside the slot, disabling the user from operating the selector switch 4. Before inserting the PC card 1 into the slot, the user operates the selector switch 4 to set an operational mode of the PC card 1.

In this case, if the user has set the PC card 1 to the 16-bit mode by the selector switch 4, then CD1 is grounded as shown in FIG. 4A; if the user has set the PC card 1 to the CardBus mode by the selector switch 4, then CD1 is connected to VS1 as shown in FIG. 4B. If the pulse signal inputted to CD1 at n2 is present at n3, then the card controller 21 decides that the PC card 1 is a CardBus-compatible one (n4), and it not, decides that the PC card 1 is a 16-bit-compatible one (n7).

If the card controller 21 decides at n4 that the PC card 1 is a CardBus-compatible one, then the card controller 21 performs a CardBus mode connection in which the inserted PC card 1 is connected by a 32-bit wide data bus (n5), and starts to supply a 3.3 V operating power VCC to the PC card 1 by controlling the regulator circuit 22 (n6). On the other hand, if the card controller 21 decides at n7 that the PC card 1 is a 16-bit-compatible one, then the card controller 21 performs a 16-bit mode connection in which the PC card 1 is connected by a 16-bit wide data bus (n8), and starts to supply a 5 V operating power VCC to the PC card 1 by controlling the regulator circuit 22 (n9).

The PC card 1, when supplied with the operating power VCC of a 3.3 V or 5 V voltage from the information processing apparatus at n6 or n9, starts to operate with the power circuit 13 supplying an operating power VDD to the control section 11 or the like. As described above, the power circuit 13 is a constant-voltage power supply circuit, its output voltage (VDD) being about 3.3 V. When the operating power VDD starts to be supplied (n21), the control section 11 decides whether the MODE signal is High or Low (n22) . If the user has set the PC card 1 to the 16-bit mode, the MODE signal is Low as shown in FIG. 4A; if the user has set the PC card 1 to the CardBus mode, the MODE signal is High as shown in FIG. 4B. If the MODE signal is High, the control section 11 decides that the CardBus mode has been selected, starting the operation in the CardBus mode (n23). On the other hand, if the MODE signal is Low, the control section 11 decides that the 16-bit mode has been selected, starting the operation in the 16-bit mode (n24).

As a result, data communications between the information processing apparatus and the PC card 1 in the 16-bit mode or the CardBus mode selected by the selector switch 4 are enabled (n10, n25)

As shown above, the PC card 1 of this embodiment can be operated in either the CardBus mode or the 16-bit mode by the selector switch 4. Accordingly, the user is enabled to operate the PC card 1 in a proper operational mode (CardBus mode or 16-bit mode) depending on the use environment. For example, the PC card 1 can be used in the CardBus mode for use in a CardBus-compatible information processing apparatus, and can be used in the 16-bit mode for use in a 16-bit-compatible information processing apparatus, thus the PC card 1 being usable both in a CardBus-compatible information processing apparatus and in a 16-bit-compatible information processing apparatus while making full use of the functions of the CardBus-compatible information processing apparatus.

In addition, although the case in which the PC card 1 is connected to a 16-bit-compatible information processing apparatus has been omitted in the above description, the 16-bit-compatible information processing apparatus unconditionally decides that the connected PC card 1 is a 16-bit-compatible one, starting to supply an operating power of a 5 V voltage. In this case, if the user has set the PC card 1 to the 16-bit mode, the PC card 1 can be put into use without any difficulty. Even in the case where the user has erroneously set the PC card 1 to the CardBus mode, since an operating power of about 3.3 V is supplied to the control section 11 or the like by the power circuit 13, the result would be only that the functions of the PC card 1 are disabled, and the PC card 1 is in no case damaged.

Also, while the information processing apparatus and the PC card 1 are connected to each other, the selector switch 4 is located inside the slot so that the user is inhibited from operating the selector switch 4. Therefore, the PC card 1 can be prevented from being changed over in operational mode while data communications between the information processing apparatus and the PC card 1 are going on. This also prevents occurrence of problems such as malfunction due to a changeover of the operational mode during the operation and damage of the PC card 1 and the information processing apparatus.

Although the selector switch 4, which is a piece of hardware, has been used to change over the operational mode of the PC card 1 in the above embodiment, the PC card 1 can also be provided so as to be operated in the CardBus mode for a CardBus-compatible information processing apparatus, and operated in the 16-bit mode for a 16-bit-compatible information processing apparatus, without providing the selector switch 4.

As a first example of this system, the PC card 1 may be provided with a function of detecting a signal VS1 (an appropriate pulse signal inputted from the information processing apparatus proper), and a function of, when the signal VS1 is an appropriate pulse signal (a pulse signal outputted to VS1 at n2 by the CardBus-compatible information processing apparatus), outputting to CD1 a pulse signal generally the same as VS1, and at the same time, setting the PC card 1 to the CardBus mode. However, because the information processing apparatus starts to supply the operating power to the PC card 1 after a decision as to whether the connected PC card 1 is 16-bit compatible or CardBus compatible as described above, there arises a need for the PC card 1 to incorporate circuits for realizing these functions as well as power supply such as batteries for operating these circuits. As a result, in this case, there are disadvantages that the PC card 1 takes higher manufacturing cost as compared with the counterpart shown in the foregoing embodiment in which the operational mode is changed over in a hardware fashion, and that while used in CardBus-compatible information processing apparatus, the PC card 1 necessarily operates in the CardBus mode and therefore cannot be put into operation in the 16-bit mode upon unstable operation of peripheral equipment. The PC card 1 of this embodiment, however, has an advantage that no mis-settings of the operational mode occur against the cases where the PC card 1, if erroneously set to the CardBus mode, does not operate when inserted into a 16-bit-compatible information processing apparatus, and where the PC card 1, if erroneously set to the 16-bit mode, takes longer processing time when inserted into a CardBus-compatible information processing apparatus, and so on. Moreover, the user can be freed from troublesome switching operations.

Next described is a PC card which, after starting to be supplied with operating power from an information processing apparatus, decides whether the connected information processing apparatus is CardBus compatible or 16-bit compatible, depending on the state of a particular signal connected to the information processing apparatus, and then automatically sets the operational mode, thus eliminating the need of power supply such as batteries and thereby suppressing increase in the manufacturing cost.

The PC card 1 of this embodiment, after starting to be supplied with operating power, decides and sets an operational mode depending on the state of a signal VS1 connected to the information processing apparatus. A CardBus-compatible information processing apparatus outputs an appropriate pulse signal upon insertion of the PC card 1 therein, and decides whether the inserted PC card is CardBus compatible or 16-bit compatible, thereafter holding VS1 at Low. On the other hand, in a 16-bit-compatible information processing apparatus, VS1 is set High (pulled up).

Figure 8:
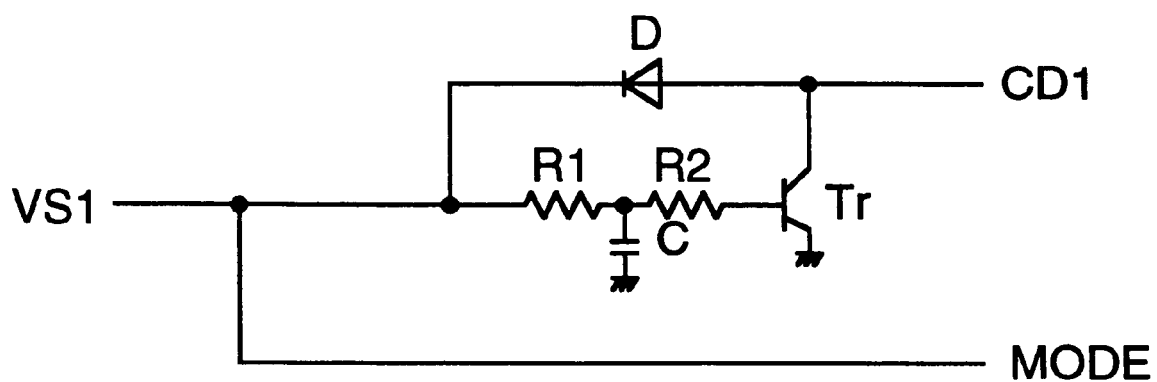
FIG. 8 is a view showing the constitution of part of a PC card according to another embodiment of the invention.

The PC card 1 of this embodiment is generally similar in constitution to that shown in FIG. 3, but differs therefrom in that the selector switch 4 is replaced with a circuit shown in FIG. 8. Referring to FIG. 8, VS1 and CD1 represent signals connected to the information processing apparatus, and MODE represents a MODE signal to be inputted to the control section 11. First, description is made on a case where the PC card 1 of this embodiment is connected to a CardBus-compatible information processing apparatus. As described above, the CardBus-compatible information processing apparatus, upon a detection that the PC card 1 has been inserted, inputs an appropriate pulse signal to VS1 and, depending upon whether or not this pulse signal is present at CD1, decides whether the inserted PC card 1 is CardBus compatible or 16-bit compatible. The PC card 1 of this embodiment has a filter circuit composed of resistor R1 and capacitor C as shown in FIG. 8, so that the transistor Tr is not driven by the appropriate pulse signal inputted to VS1. Also, since CD1 is pulled up on the information processing apparatus proper side as shown in FIG. 5, the pulse signal inputted to VS1 appears through a diode D. Accordingly, the information processing apparatus decides that the PC card 1 is a CardBus-compatible one, and executes the n4 and following processes shown in FIG. 6. After that, the information processing apparatus holds VS1 Low and starts to supply the operating power to the PC card 1.

On the other hand, the PC card 1 starts to operate with power supply from the information processing apparatus proper side. VS1 is held Low in the case of the CardBus-compatible information processing apparatus, and held High in the case of the 16-bit-compatible information processing apparatus. In the PC card 1 of this embodiment, VS1 is outputted to the control section 11 as a MODE signal, as shown in FIG. 8. Therefore, the PC card 1 sets the operational mode to the CardBus mode if the MODE signal is Low (if the information processing apparatus is CardBus compatible), and sets the operational mode to the 16-bit mode if the MODE signal is High (if the information processing apparatus is 16-bit compatible). Accordingly, the PC card 1 operates in the CardBus mode when inserted into a CardBus-compatible information processing apparatus, and operates in the 16-bit mode when inserted into a 16-bit-compatible information processing apparatus.

In addition, in the PC card 1 of this embodiment, the operational mode to be set according to the signal level logic of the MODE signal is reversed to that of the foregoing embodiment. However, this in no case matters.

In the case where the PC card 1 of this embodiment is inserted into a 16-bit-compatible information processing apparatus, because VS1 is held High, the transistor Tr is driven so that CD1 is held Low. A resistor R2 shown in the figure is a current limiting resistor for limiting a current that flows through the base of the transistor Tr. Also because the 16-bit-compatible information processing apparatus operates by unconditionally regarding the inserted PC card 1 as a 16-bit-compatible one while the PC card 1 also operates in the 16-bit mode, the PC card 1 is thus usable without any difficulty.

As shown above, the PC card 1 of this embodiment does not need any operating power supply such as batteries, and is capable of automatically changing over the operational mode in accordance with the inserted information processing apparatus. As a result, any increase in manufacturing cost can be suppressed and troublesomeness of switching operations can be eliminated.

Figure 9A:
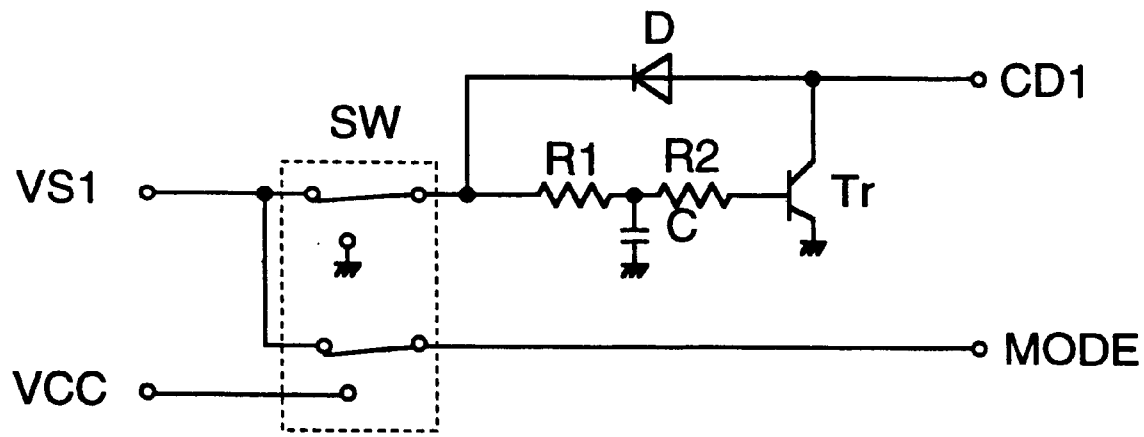
FIGS. 9A and 9B are views showing the constitution of part of a PC card according to another embodiment of the invention.
Figure 9B:
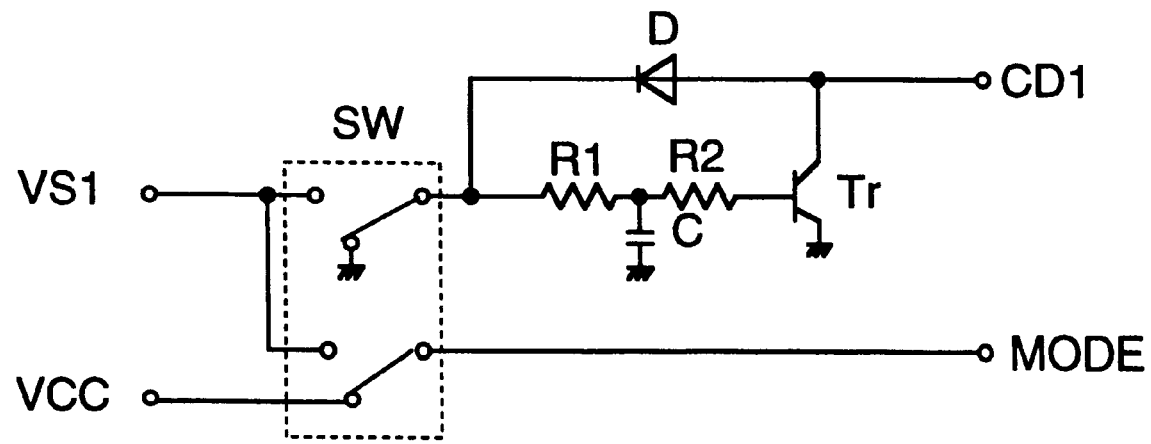

Further, when a two-contact switch SW is added to the circuit shown in FIG. 8 to make up a circuit shown in FIG. 9, the PC card 1 becomes operable not only in the CardBus mode but also in the 16-bit mode upon insertion into a CardBus-compatible information processing apparatus. This switch SW is a hard switch, and may be provided on a side face or the like of the PC card 1 as shown in FIG. 1. With the switch SW in the state shown in FIG. 9A, the case is the same with the circuit shown in FIG. 8 and its description is omitted. With the switch SW in the state shown in FIG. 9B, when the PC card 1 is inserted into a CardBus-compatible information processing apparatus, the appropriate pulse signal inputted to VS1 does not appear to CD1 so that the information processing apparatus decides that the inserted PC card 1 is a 16-bit-compatible one, starting the supply of operating power or the like. On the other hand, the PC card 1 sets the operational mode to the 16-bit mode based on that the MODE signal is High because a VDD is inputted as a MODE signal. In addition, also when the PC card 1 is inserted into a 16-bit-compatible information processing apparatus with the switch SW in the state shown in FIG. 9B, the PC card 1 operates with the operational mode set to the 16-bit mode, thus free from any problem.

As shown above, also in a CardBus-compatible information processing apparatus, the PC card 1 of this embodiment can be operated and used in the 16-bit mode by changing over the switch. Accordingly, even while used in a CardBus-compatible information processing apparatus, the PC card 1 can be operated in the 16-bit mode upon an unstable operation of peripheral equipment or the like. Further, indeed the PC card 1 disadvantageously becomes higher in manufacturing cost than that shown in FIG. 3, but advantageous in that increase in manufacturing cost is suppressed by eliminating the need of the power supply such as batteries, and moreover that the PC card 1 can securely be operated in the 16-bit mode when inserted into a 16-bit-compatible information processing apparatus.

Still another embodiment of the present invention is described below. A PC card 1 of this embodiment is one to which a circuit shown in FIG. 10 is applied instead of the circuit shown in FIG. 9. In the PC card 1 of this embodiment, a RESET signal inputted from the information processing apparatus is taken as a MODE signal. In the 16-bit mode, the RESET signal is defined as High active, and normally held Low. In the CardBus mode, on the other hand, the RESET signal is defined as Low active, conversely, and normally held High.

Figure 10A:
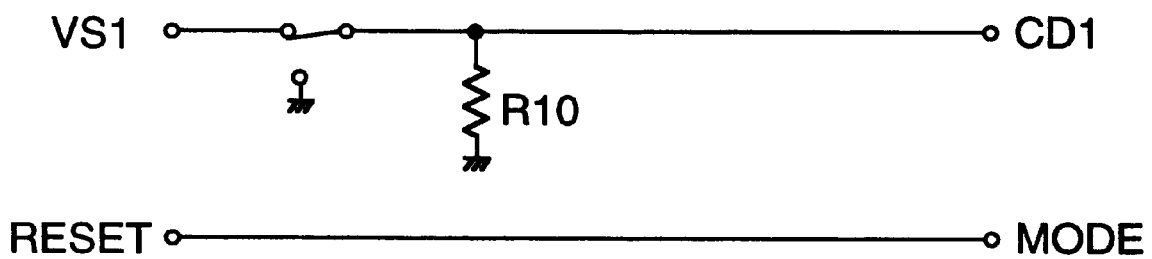
FIGS. 10A and 10B is a view showing the constitution of part of a PC card according to another embodiment of the invention.

Referring to FIG. 10, VS1, CD1 and RESET represent signals to be connected to the information processing apparatus, and MODE represents a MODE signal to be inputted to the control section 11. First described is a case where the PC card 1 with the switch SW in the state shown in FIG. 10A is inserted into a CardBus-compatible information processing apparatus. The CardBus-compatible information processing apparatus, upon a detection that the PC card 1 has been inserted, inputs an appropriate pulse signal to VS1 and, depending on whether or not this pulse signal is present at CD1, decides whether the inserted PC card 1 is CardBus compatible or 16-bit compatible. Denoted by R10 in the figure is a pull-down resistor, where since CD1 is pulled up with a resistor of about 10 kΩ in general information processing apparatuses, the pull-down resistor R10 has a resistance of about 3–4 kΩ. The appropriate pulse signal inputted to VS1 from the information processing apparatus appears at CD1. Therefore, the information processing apparatus decides that the inserted PC card 1 is a CardBus-compatible one, and executes the n4 and following processes shown in FIG. 6.

On the other hand, the PC card 1 starts to operate with operating power supplied from the information processing apparatus proper side, where since the information processing apparatus has decided that the previously inserted PC card 1 is a CardBus-compatible one, the RESET signal has been set High. Because the MODE signal is High, the PC card 1 set the operational mode to the CardBus mode.

Figure 10B:
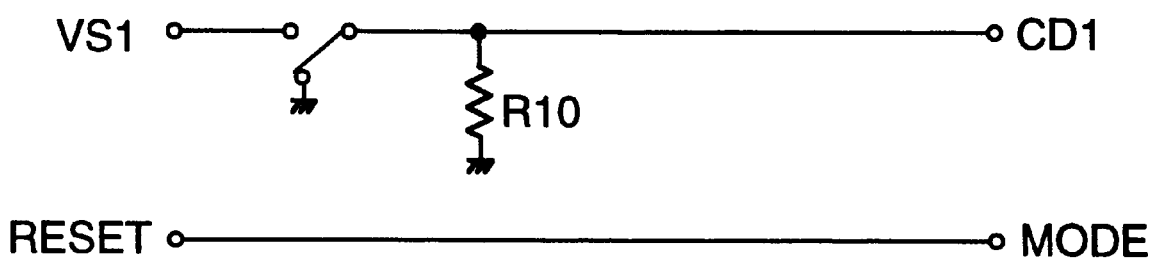

Also, in the case where the PC card 1 in the state shown in FIG. 10B is inserted into the CardBus-compatible information processing apparatus, because the appropriate pulse signal inputted to VS1 does not appear at CD1, the information processing apparatus decides that the inserted PC card 1 is a 16-bit-compatible one, and executes the n7 and following processes shown in FIG. 6. On the other hand, the PC card 1 starts to operate with operating power supplied from the information processing apparatus proper side, where since the information processing apparatus has decided that the previously inserted PC card 1 is a 16-bit-compatible one, the RESET signal has been set Low. Because the MODE signal is Low, the PC card 1 sets the operational mode to the 16-bit mode.

In addition, when the PC card 1 of this embodiment is inserted into a 16-bit-compatible information processing apparatus, the 16-bit-compatible information processing apparatus operates by unconditionally regarding the PC card 1 as a 16-bit-compatible PC card 1, so that the RESET signal is Low, whichever the state is as shown in FIG. 10A or in FIG. 10B. Therefore, the PC card 1 sets the operational mode to the 16-bit mode. Otherwise, the circuit may be given as shown in FIG. 10A by eliminating the switch SW. In this case, indeed the PC card 1 cannot be operated in the 16-bit mode in the CardBus-compatible information processing apparatus, but the user is free from feeling troublesomeness of switching operations.

As shown above, with an arrangement that the user is allowed to intentionally change over to either the CardBus mode or the 16-bit mode when the PC card 1 is used in a CardBus-compatible information processing apparatus, the PC card 1 can be operated in the 16-bit mode even in a CardBus-compatible information processing apparatus. Therefore, even while the CardBus-compatible information processing apparatus is running on a specific OS having no software such as CardBus-compatible socket services, the PC card 1 can be made usable by setting the 16-bit mode. Also, if the information processing apparatus proper or its peripheral equipment is unstable in operation with the PC card 1 used in the CardBus mode, the information processing apparatus proper or its peripheral equipment can be stabilized in operation by using the PC card 1 in the 16-bit mode. Further, in the case of an information processing apparatus that cannot afford to use two CardBus-compatible PC cards simultaneously, operating one PC card in the CardBus mode and the other in the 16-bit mode makes it possible to use the two PC cards 1 simultaneously. Like this, the user is allowed to select the operational mode of the PC card 1 depending on the use environment, so that the PC card 1 can be operated properly.

Figure 11A:
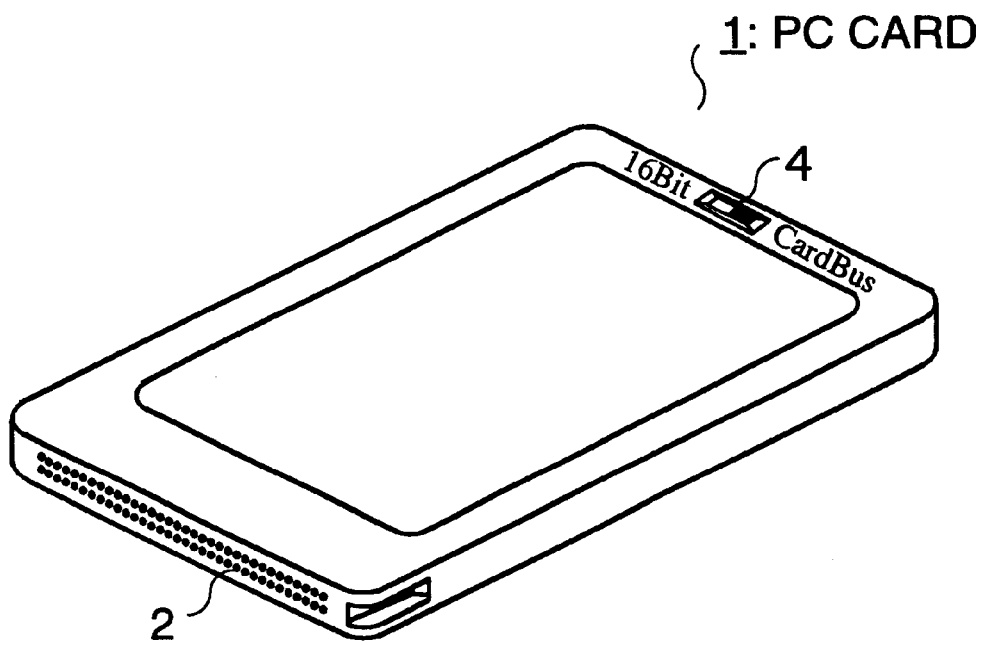
FIGS. 11A and 11B are views showing a PC card according to another embodiment of the invention.
Figure 11B:
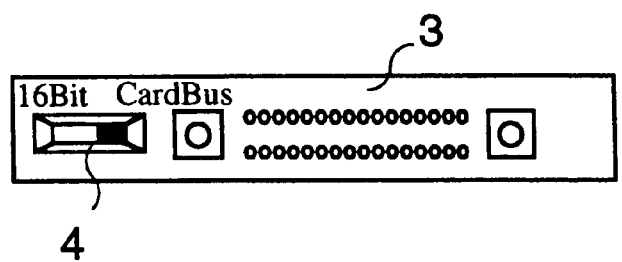

Although the selector switch 4 has been provided in a side face of the PC card 1 in the foregoing description, the selector switch 4 may also be provided in a top face of the PC card 1 as shown in FIG. 11A, in a rear face of the PC card 1 as shown in FIG. 11B, or at other places.

As described above, according to the present invention, the card-like medium can be changed over in operational mode depending on the functions of the information processing apparatus proper to which the card-like medium is connected, so that full use of the functions of the information processing apparatus proper can be made.

Also, with an arrangement that the selection means is implemented by a hard switch which is changed over artificially, the user is allowed to intentionally select an operational mode, so that the card-like medium can be operated properly according to the use environment or the like.

Further, with an arrangement that the selection means is automatically changed over depending on the state of a specific signal inputted from the information processing apparatus proper, troublesomeness of switching operations can be eliminated and the card-like medium can be operated in the CardBus mode when used in a CardBus-compatible information processing apparatus, and operated in the 16-bit mode when used in a 16-bit-compatible information processing apparatus.

Further, by providing the hard switch so that the hard switch comes to be located inside the slot when the card-like medium is connected to the information processing apparatus, the hard switch located inside the slot becomes inoperable for switching operation when the card-like medium and the information processing apparatus are connected to each other. Therefore, the possibility that the user misoperates the hard switch to change over the operational mode while data communications between the card-like medium and the information processing apparatus are going on can be prevented, thus preventing occurrence of such problems as malfunction due to a changeover of the operational mode during the operation and damage of the card-like medium and the information processing apparatus.

Further, by the provision of a constant-voltage power supply circuit which is fed with power supply from the information processing apparatus proper and which supplies a generally constant-voltage operating power to individual sections of the card-like medium, the individual sections of the card-like medium can be free from any damage due to application of an overvoltage even when the voltage of the power supplied from the information processing apparatus proper differs depending on the information processing apparatus to which the card-like medium is connected.

Furthermore, the PC card according to the present invention can be operated both in a mode for performing data communications based on the 16-bit system and in a mode for performing data communications based on the CardBus system, so that the PC card can be used in an optimal mode in accordance with the use environment.

INDUSTRIAL APPLICABILITY

The present invention is useful for extension of available models of personal computers to which the PC card can be connected.

What is claimed is:

1. A card medium which, when inserted into a slot provided in an information processing apparatus proper, is connected to the information processing apparatus proper, the card medium comprising:

a control section for controlling operation in a first operational mode in which data communications with the information processing apparatus proper are carried out with a data bus having a first bit width, and operation in a second operational mode in which data communications with the information processing apparatus proper are carried out with a data bus having a second bit width;

selection means for selectively changing over between the first operational mode and the second operational mode;

a terminal to notify the information processing apparatus proper of the first operational mode or the second operational mode selected; and operational mode notifying means for notifying to the information processing apparatus proper, via the terminal and the control section, whether the first operational mode or the second operational mode is chosen by the selection means, wherein the selection means is a hard switch which is switched manually.

2. A card medium which, when inserted into a slot provided in an information processing apparatus proper, is connected to the information processing apparatus proper, the card medium comprising:

a control section for controlling operation in a first operational mode in which data communications with the information processing apparatus proper are carried out with a data bus having a first bit width, and operation in a second operational mode in which data communications with the information processing apparatus proper are carried out with a data bus having a second bit width;

selection means for selectively changing over based on a specified signal status inputted from the information processing apparatus proper between the first operational mode and the second operational mode;

a hard switch for invalidating the selection means and switching manually in spite of the specified signal status whether an operational mode is fixed to the first operational mode; and operational mode notifying means for notifying to the information processing apparatus proper whether the first operational mode or the second operational mode is chosen by the selection means.

3. The card medium according to claim 1, wherein the hard switch is provided so as to be located inside the slot when the card medium is connected to the information processing apparatus.

4. The card medium according to claim 1, further comprising a constant-voltage power supply circuit which is fed with power supply from the information processing apparatus proper and supplies a generally constant-voltage operating power to individual sections of the card-like medium.

5. A PC card which is an application of the card medium as defined in claims 1, wherein the first operational mode is an operational mode based on a 16-bit system in which data communications are carried out with a 16-bit wide data bus; and the second operational mode is an operational mode based on a CardBus system in which data communications are carried out with a 32-bit wide data bus.

6. The card medium according to claim 2, further comprising a constant-voltage power supply circuit which is fed with power supply from the information processing apparatus proper and supplies a generally constant-voltage operating power to individual sections of the card medium.

7. A PC card which is an application of the card medium as defined in claim 2, wherein
- the first operational mode is an operational mode based on a 16-bit system in which data communications are carried out with a 16-bit wide data bus; and
- the second operational mode is an operational mode based on a CardBus system in which data communications are carried out with a 32-bit wide data bus.

8. The card medium according to claim 1, wherein the hard switch is provided on a side surface of the card medium and cannot be changed while the card medium is inserted into the information processing apparatus.

9. A card medium which, when inserted into a slot provided in an information processing apparatus proper, is connected to the information processing apparatus proper, the card medium comprising:

- a control section to control operation in a first operational mode in which data communications with the information processing apparatus proper are carried out with a data bus having a first bit width, and operation in a second operational mode in which data communications with the information processing apparatus proper are carried out with a data bus having a second bit width;
- a hard switch to selectively change over between the first operational mode and the second operational mode, wherein the hard switch is switched manually and is provided on a side surface of the card medium and cannot be changed over while the card medium is inserted into the information processing apparatus; and
- operational mode notifying means for notifying to the information processing apparatus proper whether the first operational mode or the second operational mode is chosen by the hard switch.

* * * * *